US012748760B1

(12) United States Patent
Dain et al.

(10) Patent No.: US 12,748,760 B1
(45) Date of Patent: Sep. 29, 2026

(54) DYNAMIC ARRANGEMENT OF DATA CHUNKS IN STORAGE

(71) Applicant: International Business Machines Corporation, Armonk, NY (US)

(72) Inventors: Joseph W. Dain, Tucson, AZ (US); Yu-Cheng Hsu, Tucson, AZ (US); Swaminathan Sundararaman, San Jose, CA (US); Paul Henri Muench, San Jose, CA (US); Khanh Vi Ngo, Tucson, AZ (US); Tanveer F. Syeda-Mahmood, Cupertino, CA (US); Jonas Alexander Pfefferle, Long Island City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/092,939

(22) Filed: Mar. 27, 2025

(51) Int. Cl.
*G06F 16/00* (2019.01)
*G06F 16/21* (2019.01)
*G06F 16/22* (2019.01)
*G06F 16/2455* (2019.01)

(52) U.S. Cl.
CPC ...... *G06F 16/24553* (2019.01); *G06F 16/217* (2019.01); *G06F 16/2237* (2019.01)

(58) Field of Classification Search
CPC ............. G06F 16/24553; G06F 16/217; G06F 16/2237
See application file for complete search history.

(56) References Cited

U.S. PATENT DOCUMENTS

2019/0171624 A1* 6/2019 Douglis .............. G06F 16/1744
2025/0328685 A1* 10/2025 Han .................... G06F 11/1464

FOREIGN PATENT DOCUMENTS

| | | |
|---|---|---|
| CN | 116991977 B | 12/2023 |
| CN | 117216414 A | 12/2023 |
| CN | 115934749 B | 4/2024 |
| CN | 118093962 B | 5/2024 |
| CN | 118193857 B | 9/2024 |
| CN | 118939776 A | 11/2024 |
| KR | 10-2726490 B1 | 11/2024 |

OTHER PUBLICATIONS

Afzal et al., "Towards Optimizing a Retrieval Augmented Generation using Large Language Model on Academic Data", arXiv:2411.08438 [cs.AI], Nov. 13, 2024, 11 pages.

* cited by examiner

*Primary Examiner* — Paul Kim
(74) *Attorney, Agent, or Firm* — Monchai Chuaychoo

(57) ABSTRACT

A method, according to one approach, includes: storing pointers in a vector database, the pointers referencing respective source data chunks on a storage device. Moreover, similar ones of the source data chunks are collocated in the storage device. In response to executing a similarity search, a pointer is received from the vector database. The received pointer is used to return a respective one of the source data chunks from the storage device. Furthermore, the returned source data chunk is transparently provided to an upstream application.

20 Claims, 7 Drawing Sheets

DYNAMIC ARRANGEMENT OF DATA CHUNKS IN STORAGE

BACKGROUND

The present invention relates to data processing, and more specifically, this invention relates to storing ingested data remotely.

Increased data production has amplified the overhead associated with data management and processing. While artificial intelligence (AI) has been developed in an attempt to combat this rise in processing overhead, advancements in AI have introduced their own challenges. For instance, as the amount of data AI based models are able to ingest increases, the storage footprint associated with these models increases as well. This in turn impacts vector storage and other aspects of maintaining the data accessed and/or referenced by the AI based models. As the amount of data that is ingested increases, the costs associated with memory and compute consumed also increases.

SUMMARY

A method, according to one approach, includes: storing pointers in a vector database, the pointers referencing respective source data chunks on a storage device. Moreover, similar ones of the source data chunks are collocated in the storage device. In response to executing a similarity search, a pointer is received from the vector database. The received pointer is used to return a respective one of the source data chunks from the storage device. Furthermore, the returned source data chunk is transparently provided to an upstream application.

A computer program product, according to another approach, includes: one or more computer-readable storage media. The computer program product also includes program instructions that are stored on the one or more storage media to perform the foregoing method.

A computer system, according to yet another approach, includes: a processor set, and one or more computer-readable storage media. The computer system also includes program instructions that are stored on the one or more storage media to cause the processor set to perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
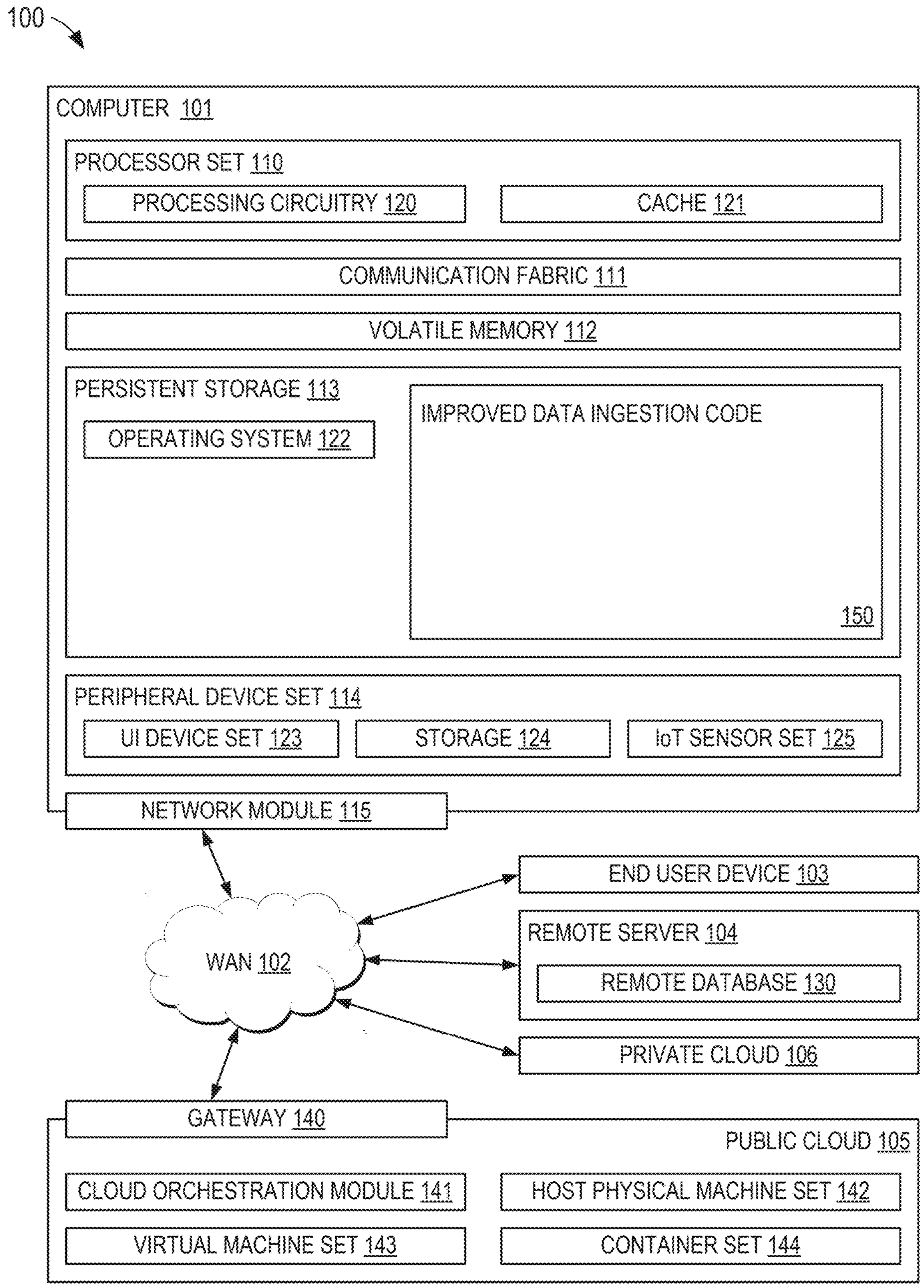
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for improving the efficiency by which data chunks are ingested and maintained in order to process received requests is illustrated in accordance with one approach. Approaches herein use vectors and pointers to significantly increase the amount of data that may be serviced by a given vector database, e.g., as will be described in further detail below.

In one general approach, a method includes: storing pointers in a vector database, the pointers referencing respective source data chunks on a storage device. Moreover, similar ones of the source data chunks are collocated in the storage device. In response to executing a similarity search, a pointer is received from the vector database. The received pointer is used to return a respective one of the source data chunks from the storage device. Furthermore, the returned source data chunk is transparently provided to an upstream application.

In another general approach, a computer program product includes: one or more computer-readable storage media. The computer program product also includes program instructions that are stored on the one or more storage media to perform the foregoing method.

In yet another general approach, a computer system includes: a processor set, and one or more computer-readable storage media. The computer system also includes program instructions that are stored on the one or more storage media to cause the processor set to perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved data ingestion code in block 150 for improving the efficiency by which data chunks are ingested and maintained in order to process received requests is illustrated in accordance with one approach. Approaches herein use vectors and pointers to significantly increase the amount of data that may be serviced by a given vector database, e.g., as will be described in further detail below.

In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By "integrated with," what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, increased data production has amplified the overhead associated with data management and processing. While AI has been developed in an attempt to combat this rise in processing overhead, advancements in AI have introduced their own set of issues. For instance, conventional products have experienced impedance issues with respect to the amount of data AI based models are able to ingest compared to the associated storage demand. These conventional products have thereby been unable to operate and maintain data vector databases in a cost-effective manner. As the amount of data that is ingested increases, the costs associated with memory and compute consumption significantly increase.

According to a tested example, 30 million source chunks (making up only 8% of the total data) were ingested, resulting in a monthly cost for the vector database of $16,000. Current data demands have thereby become cost prohibitive at large scale for conventional products and a desire exists for a novel approach to addressing this widespread issue.

In sharp contrast to the foregoing shortcomings experienced by conventional systems, approaches herein are desirably able to process queries received from AI based and other applications in an effective and efficient manner without storing any of the related data with the vectorized information derived therefrom. Rather, by implementing pointers in vector databases that reference data stored externally, approaches herein are able to transparently provide requested data to upstream applications without the applications noticing that the relevant data was returned from external storage, rather than being co-located with the vector database information. Thus, approaches herein are able to significantly reduce memory consumption and increase vectorized content with reduced costs, while maintaining desirable performance levels that allow AI based applications and/or users to operate without impact (e.g., increased latency), e.g., as will be described in further detail below.

Figure 2A:
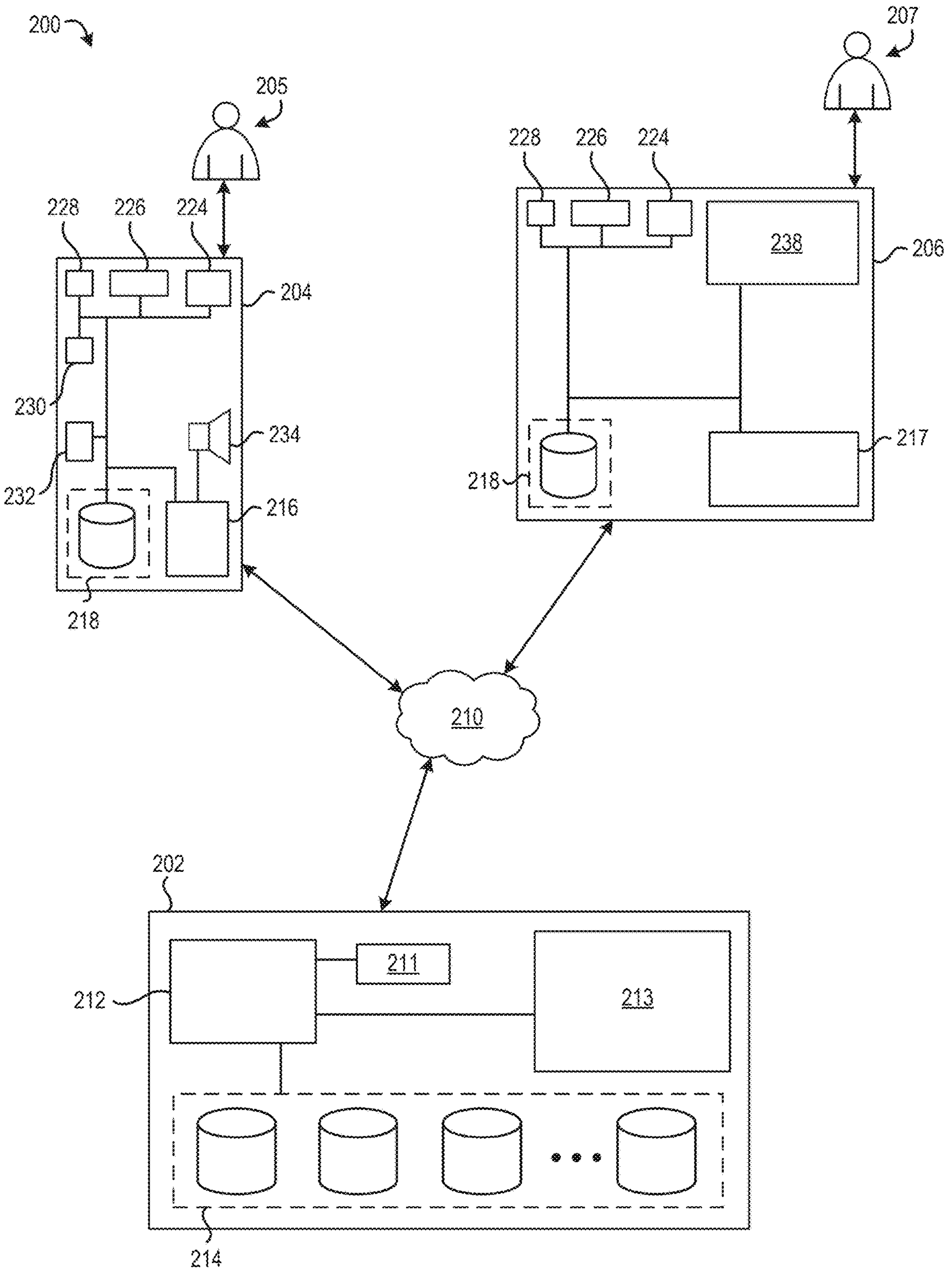
FIG. 2A is a representational view of a distributed system, in accordance with one approach.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data," "data chunks," "metadata," and "information" herein are in no way intended to be limiting either, and may include any desired type of details, e.g., depending on the type of operating system implemented on the user device 204, edge node 206, and/or central server 202. For instance, depending on the approach a data chunk as used herein may include text, stationary image based information (e.g., pixel outputs), motion based image information (e.g., video clips), etc.

In some approaches, portions of a dataset of textual entries (e.g., strings of alphanumeric characters) that have been generated at, received at, stored at, identified at, etc. the central server 202 may be sent to the edge node 206. According to an example, the central server 202 may manage a vector database having vectors and pointers correlated with external data chunks. In other words, the vector database (also referred to herein as "knowledge database") may use pointers to correlate vectors to data chunks that are stored remotely. Entries in the vector database determined as being related to a received query may thereby be used to locate, retrieve, and use the corresponding data chunk to satisfy the query, e.g., as will be described in further detail below.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 and/or processor 212 are able to train one or more AI based models. For instance, AI model(s) may be trained in some approaches by applying a predetermined training data set to learn how to evaluate incoming queries and identify data chunks and/or the vector representations thereof that correspond to the queries. For example, AI models may be trained to evaluate voice based prompts, text-based submissions, video feeds, etc., in order to identify what is being conveyed in the query. AI model(s) may be trained in other approaches by applying a predetermined training data set to learn how to identify the intent (e.g., context) contained in a given query. AI based models may also be able to correlate the interpreted context with data chunks in storage devices. For example, AI models may be trained to identify data chunks that are relevant to interpreting, processing, satisfying, etc., the received query and output a response.

In some approaches, this may be achieved by implementing prompt tuning, more specifically multi-prompt tuning (MPT). With respect to the present description, "prompt tuning" refers to the process of adapting a base pretrained model to each desired task via conditioning on learned prompt vectors. For instance, prompt tuning may be used to efficiently adapt large language models (LLMs) to multiple downstream tasks. It should also be noted that "MPT" refers to a process, which initially includes learning a single transferable prompt by distilling knowledge from multiple task-specific source prompts. Furthermore, multiplicative low rank updates to this shared prompt are learned to efficiently adapt it to each downstream target task, e.g., as would be appreciated by one skilled in the art after reading the present description. As a result, approaches herein are able to exploit the rich cross-task knowledge with prompt vectors in a multitask learning setting.

According to some approaches, the AI module 213 and/or data storage array 214 includes a vector storage pool that includes a number of datasets that have each been applied to a number of encoding models. In some approaches, each encoding model may correspond to a different AI based implementation that is supported by the system. In other words, each encoding model may apply a different interpretation to a given dataset in a way that is unique to the respective AI based implementation. In one example, language based RAG applications may correspond to each of the respective encoding models. In another example, each encoding model may correspond to a different LLM. The LLMs that may be supported by the system may include, but are in no way limited to, the T5 transformer model, the Bidirectional Encoder Representations from Transformers (BERT) language model, the ELECTRA language model, etc., or any other LLMs (e.g., language spaces) that would be apparent to one skilled in the art after reading the present description. It follows that each of the encoding models may be configured (e.g., based at least in part on the corresponding AI based implementation) to evaluate a particular language (e.g., human language, computer coding language, motion based communication, etc.) and/or a particular medium (e.g., text, images, videos, etc.) depending on the desired approach.

Each entry in the vector database may be compared against vector information received from other locations. For example, a mean vector received from the edge node 206 may be compared against the entries in the vector database and identify the "N" entries that are a closest match to the received mean vector. In some approaches, entries in the vector database may be organized such that the distance between entries is inversely proportional to how similar the entries are. A received mean vector may thereby be plotted in the vector database and the "N" closest entries may be selected as the datasets that are a closest match to the dataset that produced the mean vector, e.g., as would be appreciated by one skilled in the art after reading the present description.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some queries (e.g., involving non-sensitive data) may be received from user 205 for evaluation using AI module 213 at central server 202. The query may be received as a result of the user 205 using one or more applications, software programs, temporary communication connections, etc. running on the user device 204. For example, the user 205 may submit a query involving data stored at the data storage array 214, to be evaluated using processor 212 and/or AI module 213 of central server 202. As a result, the query is evaluated using processor 212 and/or AI module 213 and data stored in data storage array 214 is returned before being used to satisfy the received query. However, in some approaches, the data storage array 214 may be used to return relevant data directly in response to received queries.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238. As described above with respect to AI module 213, the AI module 238 may include any desired number and/or type of AI-based models. It follows that AI module 238 may implement similar, the same, or different characteristics as AI module 213 in central server 202. In some approaches, AI module 238, controller 217, and/or edge node 206 as a whole may be configured to operate in ultra-low latency situations (e.g., less than about 1 millisecond).

Figure 2B:
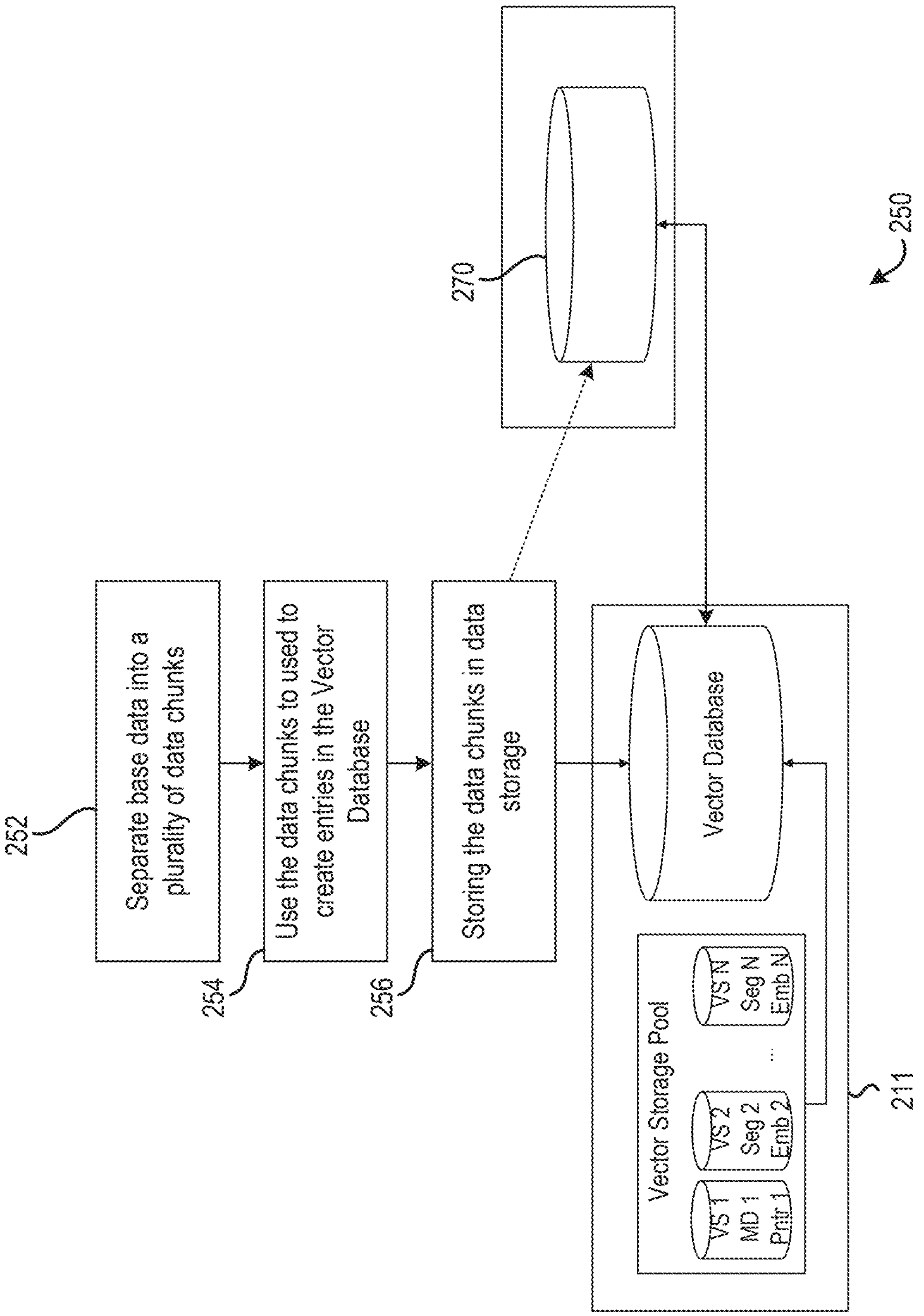
FIG. 2B is a representational diagram of dynamically processing queries, in accordance with one approach.

Referring momentarily now to FIG. 2B, a representational diagram 250 of dynamically processing queries using data chunks that have been ingested to create a vector database, is illustrated in accordance with one approach which is in no way intended to be limiting. As an option, the present diagram 250 may be implemented in conjunction with features from any other approach listed herein, such as those described with reference to the other FIGS., such as FIG. 2A. However, such diagram 250 and others presented herein may be used in various applications and/or in permutations which may or may not be specifically described in the illustrative approaches listed herein. Further, the diagram 250 presented herein may be used in any desired environment. Thus FIG. 2B (and the other FIGS.) may be deemed to include any possible permutation.

As noted above, the process of developing the Vector Database involves separating base data into a plurality of data chunks. See operation 252. Depending on the approach, the base data may be in different forms. For instance, the base data may include text files, images, videos, audio files, performance metrics, outputs produced by one or more trained AI based models, etc. Moreover, depending on the type of information that is included in the base data, the information may be divided into the different data chunks differently. In one example, operation 252 includes shredding a portable document format (PDF) file into any desired number of data chunks, each chunk including an about same amount of data therein. In another example, operation 252 includes partitioning the various pixels in an image file into any desired number of data chunks, each respective data chunk including about a same number of pixels therein. These data chunks are thereby used to create entries in the Vector Database. See operation 254.

Moreover, operation 256 includes storing the data chunks in the data storage 270. In preferred approaches, the data chunks are used to form respective vectors and metadata associated therewith. The data chunks may be vectorized using any processes that would be apparent to one skilled in the art after reading the present description. Pointers are also created for each of the data chunks that identify the logical and/or physical location in data storage 270 that the respective data chunks are stored. As noted above, this allows for the source data chunks to not be stored in the vector database, conserving capacity for a larger number of vectorized entries and allowing the system to manage a larger amount of data than conventionally achievable. This also overcomes the cost based restrictions that have plagued conventional products, e.g., as will be described in further detail below.

Looking to the Vector Database, the present approach includes a Vector Storage Pool therein that arranges the entries based on the corresponding data chunk. For instance, N text segmentations formed in operation 252 are further converted into N segmentation embeddings. The N segmentation embeddings are used to form (e.g., create) N Vector Storage Pools. Each of the Vector Storage Pools include a unique vector storage identifier (e.g., VS1, VS2, . . . , VSN), metadata (e.g., MD1, MD2, . . . , MDN) from the original base data received, and at least one pointer (e.g., Pntr 1, Pntr 2, Pntr N) that correspond to the respective data chunk in external (e.g., remote) storage. These vector storage pools thereby provide an efficient and segmented process of locating relevant sections of the base data given on the specific queries (e.g., situations) the edge node is faced with.

In preferred approaches, the Vector Database is formed by identifying mappings between received queries and vector storage and/or segment relevance, e.g., as described herein. Moreover, one or more AI based models may be trained on the information included in the Vector Database, and may thereby be configured identify a relevant portion of the information included in the Vector Database. This relevant portion of the information may thereby be used to access a pointer that leads to the relevant data chunks.

Figure 3A:
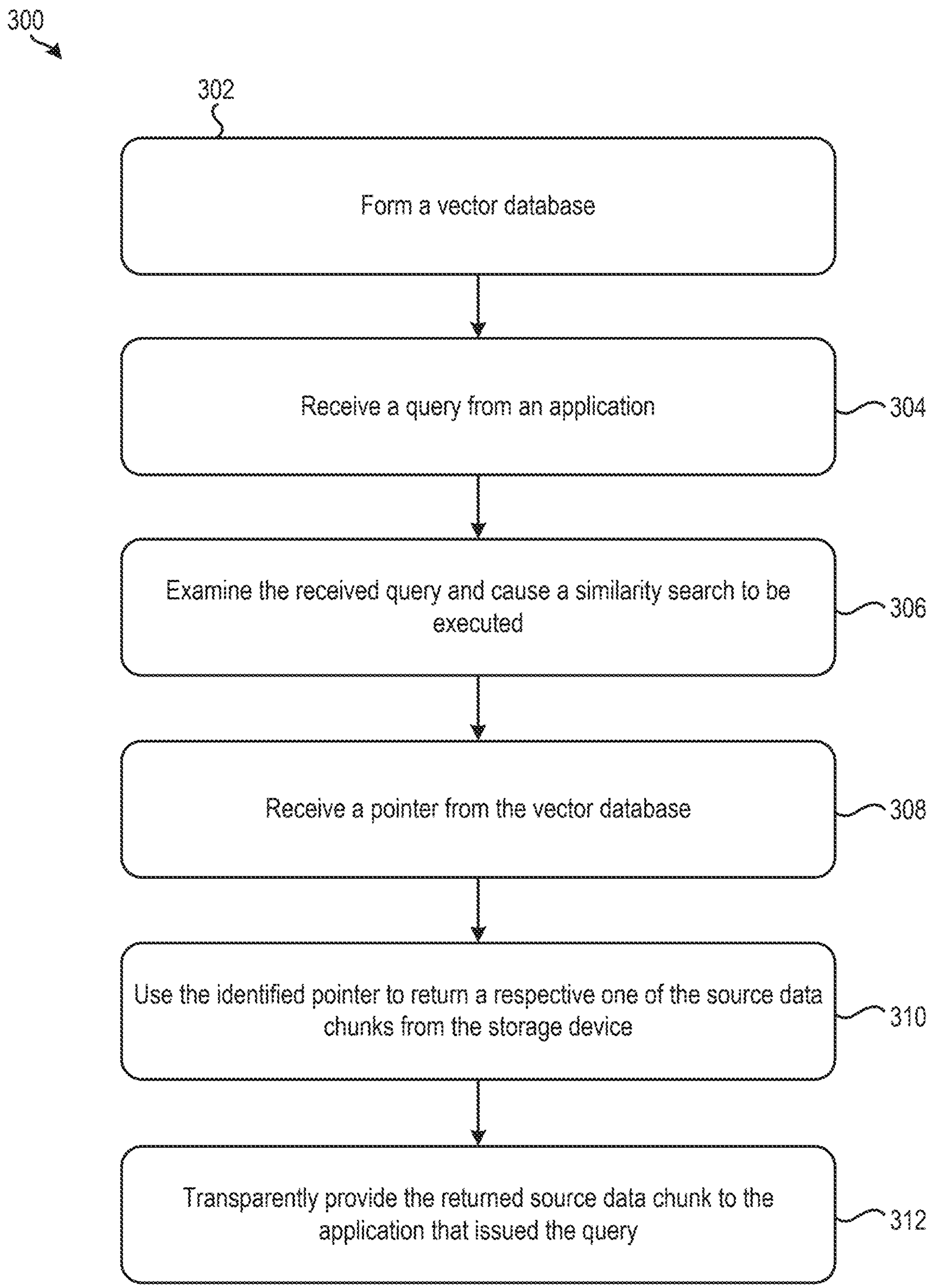
FIG. 3A is a flowchart of a method, in accordance with one approach.

Looking now to FIG. 3A, a method 300 for improving the efficiency by which data chunks are ingested and maintained in order to process received requests is illustrated in accordance with one approach. Specifically, method 300 involves using vectors and pointers to significantly increase the amount of data that may be serviced by a given vector database, e.g., as will be described in further detail below.

The method 300 may be performed in accordance with the present invention in any of the environments depicted in FIGS. 1-2B, among others, in various approaches. Of course, more or less operations than those specifically described in FIG. 3 may be included in method 300, as would be understood by one of skill in the art upon reading the present descriptions.

Each of the steps of the method 300 may be performed by any suitable component of the operating environment. For example, any one or more of the operations in method 300 may be performed by a controller at a central location (e.g., see processor 212 and/or controller 217 of FIG. 2A). In other approaches, the method 300 may be partially or entirely performed by a controller, a processor, a computer, etc., or some other device having one or more processors therein. Thus, in some approaches, method 300 may be a computer-implemented method. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Figure 3B:
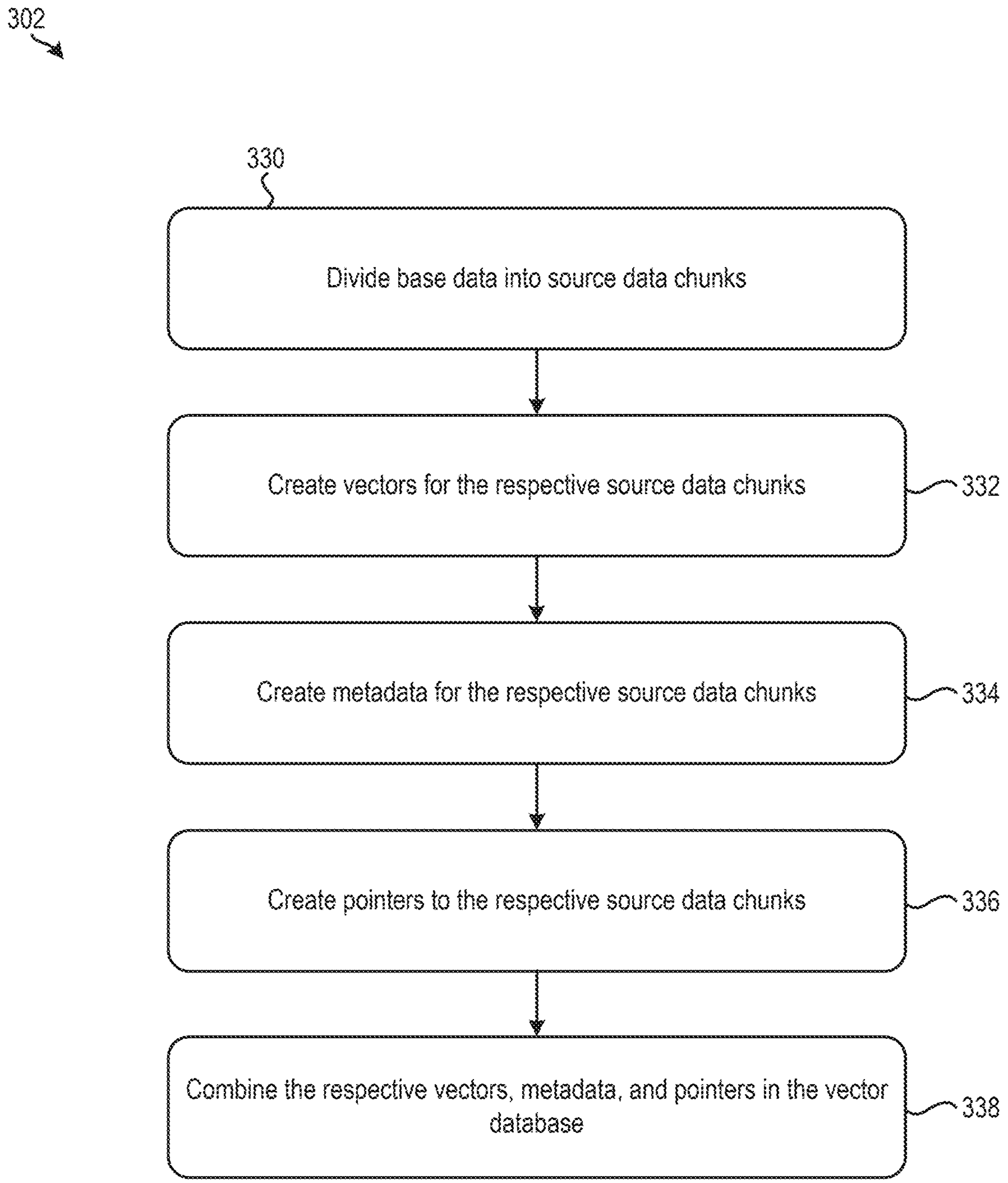
FIG. 3B is a flowchart of steps for one of the operations in the method of FIG. 3A, in accordance with one approach.

As shown, operation 302 of method 300 includes forming a vector database. As noted above, the process of forming a vector database preferably involves creating data chunks as well as vector representations of the data chunks. Referring momentarily to FIG. 3B, steps of forming the vector database are illustrated in accordance with one example which is in no way intended to be limiting.

As shown, step 330 includes dividing base data into source data chunks. In some approaches, step 330 includes shredding or dividing a larger document (e.g., collated data instance) into any desired number of smaller chunks. Moreover, the data chunks themselves may be of any desired size. However, it is preferred that each data chunk is about the same size (e.g., within about 1%).

Step 332 includes creating vectors for the respective source data chunks, while step 334 includes creating metadata for the respective source data chunks. In other words, step 332 may include using information included in each of the data chunks to create vector representations thereof. Step 334 may further extract metadata formed during the vector formation and/or form new metadata associated with the vectors created in step 332. In some approaches, the metadata extracted and/or formed in step 334 includes scalar content.

Moreover, step 336 includes creating pointers to the respective source data chunks. These pointers are able to identify the logical and/or physical location in data storage that the respective data chunks are stored. It follows that in some approaches, step 336 is performed in response to the source data chunks being stored in the storage device. As noted above, the pointers allow for the source data chunks to not be stored in the vector database, conserving capacity for a larger number of vectorized entries and allowing the system to manage a larger amount of data than conventionally achievable. This also overcomes the cost based restrictions that have plagued conventional products, e.g., as will be described in further detail below.

With continued reference to FIG. 3B, step 338 further includes combining the respective vectors, metadata, and pointers in the vector database. In other words, step 338 includes forming an entry in the vector database for each of the data chunks. Each of these entries thereby include a pointer that references a respective source data chunk in storage. In other words, step 338 includes storing pointers in a vector database, the pointers referencing respective source data chunks on a storage device. In some approaches, step 338 includes creating an entry in a vector storage pool (e.g., see FIG. 2B above). Moreover, entries in the vector database are formed such that the source data chunks are not stored in the vector database.

Returning now to FIG. 3A, method 300 advances from operation 302 to operation 304 in response to receiving a query. There, operation 304 includes receiving a query from an application. In some approaches, the query is received from an AI based application. It follows that the AI based application may automatically generate the query in response to identifying a particular pattern, a predetermined condition being met, changing operating conditions, etc. In some approaches, the AI based application includes a retrieval-augmented generation (RAG) application. In other applications, the AI based application includes one or more trained LLMs. It follows that any number of queries may be received from any number of AI based (or other types of) applications. However, it should be noted that in other approaches one or more queries may be received from other types of applications (e.g., non-AI related applications), remote users, predetermined procedures, etc. For example, approaches implementing AI based application(s) may be a RAG based chat bot that uses an LLM to generate content based off the search results provided by various approaches herein. However, approaches herein may also be implemented without interacting with a generative AI application. According to another example, a user may wish to perform a search on content (e.g., data chunks) arranged and stored according to the various approaches herein without using generative AI. In this example, the query may be a natural language query that could be converted into a vector embedding and used to perform a similarity search, such that the results are returned without generative AI functionality from the upstream application.

Operation 306 further includes examining the received query and causing a similarity search to be executed. The similarity search is executed in response to receiving the query and is based at least in part on information included in the query. For instance, context may be derived from the query using one or more of the trained LLMs. In other approaches, the query may be evaluated and compared against a lookup table to identify information for the similarity search. In some approaches, one or more instructions are sent to the vector database, causing the vector database to perform the similarity search. For example, processor 212 and/or AI module 213 of FIG. 2A may send one or more instructions which cause the Vector Database of FIG. 2B to perform a similarity search.

Referring back to FIG. 3A, method 300 advances from operation 306 to operation 308 in response to executing the similarity search. There, operation 308 includes receiving a pointer from the vector database. In other words, a pointer identified as a result of performing the similarity search is received in operation 308. The identified and received pointer is further used to return a respective one of the source data chunks from the storage device. See operation 310. According to one approach, operation 310 includes using the pointer to send a targeted request to data storage for the corresponding data chunks. This request may be sent to the data storage over networks, physical connections, logical connections, etc. depending on the configuration. Again, this allows for approaches herein to store relevant data in external storage, rather than it being co-located with vector database information. Thus, approaches herein are able to significantly reduce memory consumption and increase vectorized content with reduced costs, while maintaining desirable performance levels that allow AI based applications and/or users to operate without impact (e.g., increased latency).

Accordingly, operation 312 further includes transparently providing the returned source data chunk to the application that issued the query. For instance, the returned source data chunk may be processed and returned to an upstream AI based application that issued the query without the application noticing that the relevant data was returned from external storage, rather than being co-located with the vector database information. Again, approaches herein are thereby able to significantly reduce memory consumption and increase vectorized content with reduced costs, while maintaining desirable performance levels that allow AI based applications and/or users to operate without increased latency.

It should also be noted that approaches herein preferably store data chunks in storage such that similar ones of the source data chunks are collocated in the storage devices. In other words, data chunks that include similar data, are typically accessed together, have a same access rate (e.g., heat level), etc., or are otherwise considered "similar" to each other are preferably stored in memory such that they are logically and/or physically located adjacent to each other. As noted above, this desirably reduces the access time for similar data chunks and results in queries being satisfied more efficiently. Thus, approaches herein are able to significantly reduce memory consumption and increase vectorized content with reduced costs, while maintaining desirable performance levels that allow AI based applications and/or users to operate without impact (e.g., increased latency). In some approaches, a key value store (or any store) may be used to store data chunks that are accessed together, adjacent to each other (e.g., collocated on storage). Thus, data chunks that are accessed together can be read in a single I/O operation, reducing latency. Moreover, a cluster of data chunks that are related in meaning are collocated and the individual chunks for a given operation can be retrieved from the larger collection of data. For approaches that implement a clustered index, the larger collection of data can be based on the clusters of the index. Based on the efficient segment I/O size for storage, the data chunks of an index cluster can be in the same set of segments. Furthermore, the data chunks for a cluster can be relocated between cluster segments to minimize I/Os or I/O sizes over time, e.g., as will be described in further detail below.

Figure 3C:
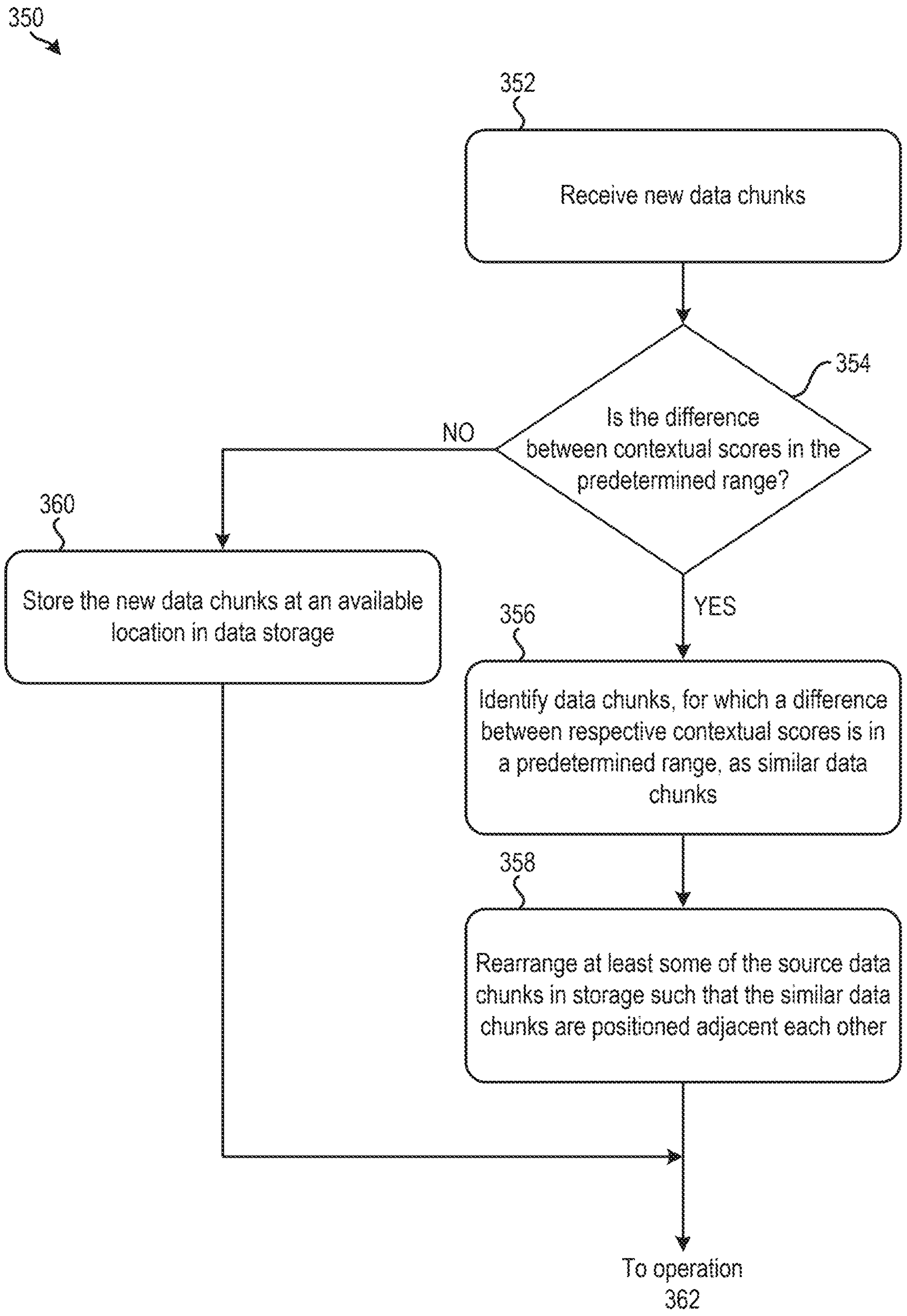
FIG. 3C is a flowchart of a method, in accordance with one approach.
Figure 3C:
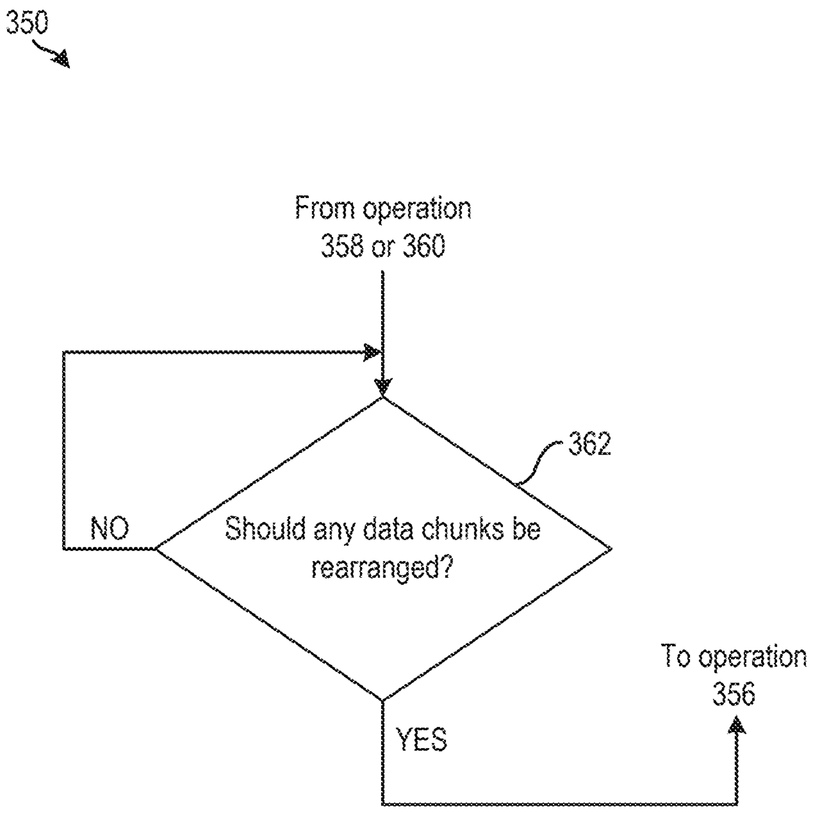

Referring now to FIG. 3C, a method 350 for ensuring that similar data chunks are logically and/or physically located adjacent to each other in data storage is illustrated in accordance with one approach which is in no way intended to be limiting. Method 350 may be performed continuously in the background in some approaches, e.g., to ensure that data is dynamically rearranged in storage to ensure optimal proximity of similar data chunks as they change over time. In other approaches, method 350 may be performed periodically, in response to predetermined conditions being met, in response to receiving new data to ingest, in response to a direct request (e.g., command), etc. It follows that the operations of method 350 may be repeated any desired number of times.

As shown, operation 352 includes receiving new data chunks. Depending on the approach, the new data chunks may be received from an edge node, from a running application, from a user, etc. In some approaches, larger arrangements of data may be received and used to form individual data chunks in operation 352.

From operation 352, method 300 advances to operation 354. There, operation 354 includes determining whether any differences between respective contextual scores of the new data chunks and contextual scores of the source data chunks in the storage device are in the predetermined range. In other words, operation 354 includes determining whether any of the new data chunks are sufficiently similar to any existing data chunks in the storage device. The "contextual score" of a given data chunk refers to a determined score which provides insight as to the meaning of the given chunk and/or what it is associated with. In one example, an LLM may assign a contextual score to each data chunk based on evaluating the data included therein. In other words, the contextual score may be used to identify data chunks that are related to the same or similar queries. For instance, operation 354 includes determining a difference between the contextual scores of two or more data chunks, and comparing the difference to a predetermined range. This range may be predetermined by a user, based on information included in the received query, based on past performance, etc. For example, data chunks identified as having contextual scores that are within about 25%, more preferably within about 20%, more preferably within about 10%, still more preferably within about 5%, still more preferably within about 2%, still more preferably within about 1%, etc., of each other.

As a result, data chunks in storage that are similar to ones of the newly received data chunks may be identified. Method 300 advances to operation 356 in response to identifying one or more source data chunks that are substantially similar to one or more of the new data chunks. There, operation 356 includes identifying data chunks, for which a difference between respective contextual scores is in a predetermined range, as similar data chunks. In other words, operation 356 identifies source data chunks in the storage device and/or new data chunks that are similar to each other. Moreover, operation 358 includes rearranging at least some of the source data chunks in storage such that the similar data chunks are positioned adjacent to each other. In other words, the similar new data chunks are positioned adjacent the similar source data chunks. It follows that in some approaches, method 350 advances to operations 356, 358 in response to determining a difference between the contextual score of a first of the new data chunks and contextual scores of at least one (e.g., a subset) of the source data chunks in the storage device are in the predetermined range. There, operation 358 includes rearranging the source data chunks in the storage device preferably such that the first new data chunk is logically and/or physically collocated with the subset of source data chunks in the storage device identified as being similar.

Returning top operation 354, method 350 alternatively advances to operation 360 in response to determining that none of the source data chunks are sufficiently similar to the new data chunks. There, operation 360 includes storing the new data chunks at an available (e.g., convenient) location in data storage. For instance, operation 360 may include simply storing the new data chunks at a current append location in storage. In other approaches, new data chunks that are similar to each other are grouped together and stored adjacent to each other for more efficient access and reduced latency processing queries.

Advancing now to operation 362, there method 300 monitors the data chunks in storage over time and determines whether they should be rearranged. For instance, operation 362 may include comparing the contextual scores of the various data chunks as they are updated over time and determine whether any two or more data chunks in storage are sufficiently similar to each other. In other approaches, operation 362 may include identifying source data chunks in the storage device that are accessed together (e.g., within a predetermined amount of time) as similar source data chunks. Depending on the approach, this may be based at least in part on evaluating past performance with one or more AI based models that are trained to identify patterns in how data is accessed and/or used.

It follows that in response to determining that at least some of the data chunks in storage should be rearranged such that similar data chunks are located adjacent each other, method 350 returns to operation 356 from operation 362. There, the similar data chunks are updated to reflect the changes identified in operation 362, before rearranging the data chunks in operation 358. It follows that in some approaches, operation 358 includes rearranging at least some of the source data chunks such that the similar source data chunks are logically and/or physically positioned adjacent to each other in the storage device. In other words, the "similar" data chunks include information which is identified as being accessed together. However, in some approaches data chunks having "similar" embeddings (e.g., formed from text segmentations having similar meaning) may be co-located in storage. This allows for associated data chunks to be co-located in storage and retrieved together in response to receiving similar vectors. Again, by intentionally co-locating data chunks that are identified as being "similar," approaches herein are desirably able to reduce latency by reducing data access times, e.g., as would be appreciated by one skilled in the art after reading the present description.

It follows that approaches herein are desirably able to store data chunks in an efficient manner and may be used in some approaches to displace other file storage data blocks in order to co-locate ones that are currently similar. In some approaches, displacing existing file storage may involve weighing logical in-memory operations versus file system operations costs. Indexing may also involve dual costs of being performed in vector databases as well as in file systems. According to one example, which is in no way intended to be limiting, an approach that implements diskANN for an index may convert all data chunks into files.

Again, approaches herein are desirably able to leverage vector databases for AI based applications in a more efficient and scalable manner that meets the demands of enterprise applications with large amounts of unstructured data. According to an in-use example, which is in no way intended to be limiting, the typical response times for different types of storage are: 10 ns for memory, 10 us for SSD, and milliseconds for object storage. Assuming that LLM prompts are enhanced with 10 data chunks, the worst case is 10 storage operations for the 10 chunks. These storage operations can further be executed in parallel. Optimistic cases outline that object storage can fulfill requests in parallel and the data chunks would be available in a few milliseconds. Worst cases involves object storage fulfilling the requests in serial and the chunks would be available in about 100 ms. Caching can mitigate the worst-case response times when many users are asking similar questions and relying on the same chunks. Collocating chunks can reduce the number of I/Os thus reducing the worst-case impact. In all cases the worst-case of 100 ms storage response time is less than 10% of the RAG query time. This seems a reasonable tradeoff for using much less memory.

According to another in-use example, which is in no way intended to be limiting, vectors used in RAG approaches typically use 256 to 1024 elements. Assuming each vector element is 4 bytes, the amount of storage consumed by a vector is 1K or 4K bytes. Typical chunk sizes are 128 bytes to 1K bytes, resulting in the best case being a 50% savings in memory by storing chunks on storage. 1 million vectors use at least 1 GB of memory and 1 billion vectors use at least 1 TB of memory, so at large cost savings achieved by the approaches herein become significant, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method comprising:

storing pointers in a vector database, the pointers referencing respective source data chunks on a storage device;

assigning, using a large language model, respective contextual scores to the respective source data chunks based on evaluating data included therein;

identifying the respective source data chunks, for which a difference between respective contextual scores is in a predetermined range, as similar to the respective source data chunks;

rearranging at least some of the respective source data chunks such that the similar source data chunks are logically and/or physically positioned adjacent to each other in the storage device;

in response to executing a similarity search, receiving a pointer from the vector database;

using the received pointer to return a respective one of the source data chunks from the storage device; and transparently providing the returned source data chunk to an upstream application, wherein the returned source data chunk is provided to the upstream application without the upstream application noticing that the returned source data chunk was returned from external storage rather than being co-located with vector database information, wherein similar ones of the respective source data chunks are co-located in the storage device.

2. The method of claim 1, further comprising:

receiving a query from the upstream application; and causing the similarity search to be executed in response to receiving the query, wherein the upstream application is a retrieval-augmented generation (RAG) application and wherein the query is converted to a vector embedding and compared to entries in the vector database to select N closest entries as similarity search results.

3. The method of claim 1, further comprising:

identifying source data chunks in the storage device, for which a difference between respective contextual scores is in a predetermined range, as similar source data chunks; and rearranging at least some of the source data chunks such that the similar source data chunks are positioned adjacent to each other in the storage device.

4. The method of claim 1, further comprising:

identifying source data chunks in the storage device that are accessed together as similar source data chunks; and rearranging at least some of the source data chunks such that the similar source data chunks are positioned adjacent to each other in the storage device, wherein the similar source data chunks that are accessed together are read in a single input/output operation to reduce latency.

5. The method of claim 1, further comprising:

receiving new data chunks;

determining whether differences between respective contextual scores of the new data chunks and contextual scores of the source data chunks in the storage device are in a predetermined range; and in response to determining a difference between the respective contextual scores of a first of the new data chunks and respective contextual scores of a subset of the source data chunks in the storage device are in the predetermined range: identify data chunks, for which a difference between respective contextual scores is in a predetermined range, as similar data chunks, and rearranging the source data chunks in the storage device such that similar data chunks are positioned adjacent to each other, wherein the rearranging is performed periodically, in response to predetermined conditions being met, or continuously to ensure optimal proximity of similar data chunks as they change over time.

6. The method of claim 1, wherein the vector database is formed by:

dividing base data into the source data chunks;

creating vectors for the respective source data chunks;

creating metadata for the respective source data chunks;

creating pointers to the respective source data chunks in response to the source data chunks being stored in the storage device; and combining the vectors, metadata, and pointers in the vector database, wherein the vector database includes a vector storage pool in which each entry includes a vector storage identifier, metadata from the base data, and at least one pointer corresponding to a respective data chunk in external storage.

7. The method of claim 6, wherein the source data chunks are not stored in the vector database.

8. A computer program product comprising:

one or more computer-readable storage media; and program instructions stored on the one or more storage media to perform operations comprising:

storing pointers in a vector database, the pointers referencing respective source data chunks on a storage device;

assigning, using a large language model, respective contextual scores to the respective source data chunks based on evaluating data included therein;

identifying respective source data chunks, for which a difference between respective contextual scores is in a predetermined range, as similar source data chunks;

rearranging at least some of the respective source data chunks such that the similar source data chunks are logically and/or physically positioned adjacent to each other in the storage device;

in response to executing a similarity search, receiving a pointer from the vector database;

using the received pointer to return a respective one of the source data chunks from the storage device; and transparently providing the returned source data chunk to an upstream application, wherein the returned source data chunk is provided to the upstream application without the upstream application noticing that the returned source data chunk was returned from external storage rather than being co-located with vector database information, wherein similar ones of the respective source data chunks are co-located in the storage device.

9. The computer program product of claim 8, wherein the operations further comprise:

receiving a query from the upstream application; and causing the similarity search to be executed in response to receiving the query.

10. The computer program product of claim 9, wherein the upstream application is a retrieval-augmented generation (RAG) application and wherein the query is converted to a vector embedding and compared to entries in the vector database to select N closest entries as similarity search results.

11. The computer program product of claim 8, wherein the operations further comprise:

identifying source data chunks in the storage device, for which a difference between respective contextual scores is in a predetermined range, as similar source data chunks; and rearranging at least some of the source data chunks such that the similar source data chunks are positioned adjacent to each other in the storage device.

12. The computer program product of claim 8, wherein the operations further comprise:

identifying source data chunks in the storage device that are accessed together as similar source data chunks; and rearranging at least some of the source data chunks such that the similar source data chunks are positioned adjacent to each other in the storage device, wherein the similar source data chunks that are accessed together are read in a single input/output operation to reduce latency.

13. The computer program product of claim 8, wherein the operations further comprise:

receiving new data chunks;

determining whether differences between respective contextual scores of the new data chunks and contextual scores of the source data chunks in the storage device are in a predetermined range; and in response to determining a difference between the respective contextual scores of a first of the new data chunks and contextual scores of a subset of the source data chunks in the storage device are in the predetermined range:

identify data chunks, for which a difference between respective contextual scores is in a predetermined range, as similar data chunks, and rearranging the respective source data chunks in the storage device such that the similar data chunks are positioned adjacent each other, wherein the rearranging is performed periodically, in response to predetermined conditions being met, or continuously to ensure optimal proximity of similar data chunks as they change over time.

14. The computer program product of claim 8, wherein the vector database is formed by:

dividing base data into the source data chunks; creating vectors for the respective source data chunks; creating metadata for the respective source data chunks;

creating pointers to the respective source data chunks in response to the source data chunks being stored in the storage device; and combining the respective vectors, metadata, and pointers in the vector database, wherein the vector database includes a vector storage pool in which each entry includes a vector storage identifier, metadata from the base data, and at least one pointer corresponding to a respective data chunk in external storage.

15. The computer program product of claim 14, wherein the source data chunks are not stored in the vector database.

16. A computer system comprising:

a processor set;

one or more computer-readable storage media; and program instructions stored on the one or more storage media to cause the processor set to perform operations comprising:

storing pointers in a vector database, the pointers referencing respective source data chunks on a storage device;

assigning, using a large language model, respective contextual scores to the respective source data chunks based on evaluating data included therein;

identifying the respective source data chunks, for which a difference between respective contextual scores is in a predetermined range, as similar source data chunks;

rearranging at least some of the respective source data chunks such that the similar source data chunks are logically and/or physically positioned adjacent to each other in the storage device;

in response to executing a similarity search, receiving a pointer from the vector database;

using the received pointer to return a respective one of the source data chunks from the storage device; and transparently providing the returned source data chunk to an upstream application, wherein the returned source data chunk is provided to the upstream application without the upstream application noticing that the returned source data chunk was returned from external storage rather than being co-located with vector database information, wherein similar ones of the respective source data chunks are co-located in the storage device.

17. The computer system of claim 16, wherein the operations further comprise:

identifying source data chunks in the storage device, for which a difference between respective contextual scores is in a predetermined range, as similar source data chunks; and rearranging at least some of the source data chunks such that the similar source data chunks are positioned adjacent to each other in the storage device.

18. The computer system of claim 16, wherein the operations further comprise:

identifying source data chunks in the storage device that are accessed together as similar source data chunks; and rearranging at least some of the source data chunks such that the similar source data chunks are positioned adjacent to each other in the storage device, wherein the similar source data chunks that are accessed together are read in a single input/output operation to reduce latency.

19. The computer system of claim 16, wherein the vector database is formed by:

dividing base data into the respective source data chunks;

creating vectors for the respective source data chunks;

creating metadata for the respective source data chunks;

creating pointers to the respective source data chunks in response to the respective source data chunks being stored in the storage device; and combining the vectors, metadata, and pointers in the vector database, wherein the source data chunks are not stored in the vector database and wherein the upstream application is a retrieval-augmented generation (RAG) application and wherein the vector database includes a vector storage pool in which each entry includes a vector storage identifier, metadata from the base data, and at least one pointer corresponding to a respective data chunk in external storage.

20. The computer system of claim 19, wherein the operations further comprise:

receiving new data chunks;

determining whether differences between respective contextual scores of the new data chunks and contextual scores of the respective source data chunks in the storage device are in a predetermined range;

in response to determining a difference between the respective contextual scores of a first of the new data chunks and contextual scores of a subset of the respective source data chunks in the storage device are in the predetermined range: identify data chunks, for which a difference between respective contextual scores is in a predetermined range, as similar data chunks, and rearranging the respective source data chunks in the storage device such that the similar data chunks are positioned adjacent each other, wherein the rearranging is performed periodically, in response to predetermined conditions being met, or continuously to ensure optimal proximity of similar data chunks as they change over time; and in response to determining the difference between the respective contextual scores of the first of the new data chunks and contextual scores of the subset of the respective source data chunks in the storage device are not in the predetermined range, storing the new data chunks at an available location in the storage device.

* * * * *